US006919657B2

(12) United States Patent
Horng et al.

(10) Patent No.: US 6,919,657 B2
(45) Date of Patent: Jul. 19, 2005

(54) COMBINATION STRUCTURE OF A MOTOR

(75) Inventors: Alex Horng, Kaohsiung (TW); Yin-Rong Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 10/682,207

(22) Filed: Oct. 10, 2003

(65) Prior Publication Data

US 2005/0077794 A1 Apr. 14, 2005

(51) Int. Cl.[7] .......................... H02K 11/00; G11B 17/02

(52) U.S. Cl. ..................... 310/67 R; 310/51; 310/68 B; 360/99.04; 360/99.07; 360/99.08

(58) Field of Search ................................ 310/67 R, 51, 310/40 MM, 68 B; 360/99.04, 99.07, 99.08; 29/596–598

(56) References Cited

U.S. PATENT DOCUMENTS 5,446,610 A * 8/1995 Elsaesser et al. ........ 360/99.08

FOREIGN PATENT DOCUMENTS

TW 456667 9/2000

OTHER PUBLICATIONS

U.S. Appl. No. 09/571,261, filed May 15, 2000, Horng et. al.

* cited by examiner

*Primary Examiner*—Darren Schuberg
*Assistant Examiner*—Leda Pham
(74) *Attorney, Agent, or Firm*—Bacon & Thomas, PLLC

(57) ABSTRACT

A combination structure of a motor has a base board, a printed circuit board and at least one sensing unit. The base board is used for placing a stator and a rotor and has at least one first assembly hole. The printed circuit board is connected to the base board and has at least one second assembly hole. The sensing unit is used for sensing a magnet of the rotor. The second assembly hole of the printed circuit board is placed corresponding to the first assembly hole of the base board for commonly containing the sensing unit so that an axial height of the motor is decreased.

11 Claims, 7 Drawing Sheets

40
31
30
50
50
20
21
22
22
13
10
12c
101

COMBINATION STRUCTURE OF A MOTOR

BACKGROUND OF THE INVENTION

1. Field of the Invention

The present invention is related to a combination structure of a motor and, more particularly, to a combination structure of a motor that has at least one assembly hole on each of a base board and a printed circuit board for containing at lease one sensing unit to decrease an axial height of the combination structure.

2. Description of the Related Art

Referring to FIGS. 1 and 2, a prior art motor structure, such as Taiwanese patent publication No.456667 "Combination Structure for DC brushless motor", includes a base board 10, a printed circuit board 20, a stator 30 and a rotor 40. The base board 10 has an axle tube adapted to assemble the printed circuit board 20, the stator 30 and the rotor 40. At least one sensing unit 50 is welded on an upper surface of the printed circuit board 20. The sensing unit 50 is placed below an annular magnet 41 of the rotor 40 and is used for sensing the annular magnet 41. The printed circuit board 20 can alternatively activate the stator 30 to cause rotation of the rotor 40.

Although the prior art motor has a simple structure, as shown in FIG. 2, during assembly of the prior art motor, the sensing unit 50 needs to be placed facing the annular magnet 41 and welded on the upper surface of the printed circuit board 20. Hence, the sensing unit 50 occupies space and increases an axial height of the prior art motor, which causes the prior art motor to be unsuitable for a small size electronic device, such as a thin optical disk drive.

Therefore, it is desirable to provide an improved motor design to mitigate and/or obviate the aforementioned problems. The present invention provides at least one assembly hole on each of the base board and the printed circuit board to contain the sensing unit. In this way, the sensing unit can avoid an increase of the axial height of the motor, which carries out a decrease of dimensions of the motor.

SUMMARY OF THE INVENTION

A main objective of the present invention is to provide a combination structure of a motor which has at least one assembly hole on each of the base board and the printed circuit board to contain the sensing unit, so that the sensing unit can avoid an increase of the axial height of the motor.

Another objective of the present invention is to provide a combination structure of a motor which has at least one assembly hole on each of the base board and the printed circuit board to contain the sensing unit at a predetermined position so the that sensing unit is easily mounted.

In order to achieve the above-mentioned objectives, the present invention includes a base board, a printed circuit board and at least one sensing unit. The base board is used for placing a stator and a rotor and has at least one first assembly hole. The printed circuit board is attached to the base board and has at least one second assembly hole. The sensing unit is used to sense a magnet of the rotor. The second assembly hole of the printed circuit board is disposed corresponding to the first assembly hole of the base board for commonly containing the sensing unit so that an axial height of the motor is decreased.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
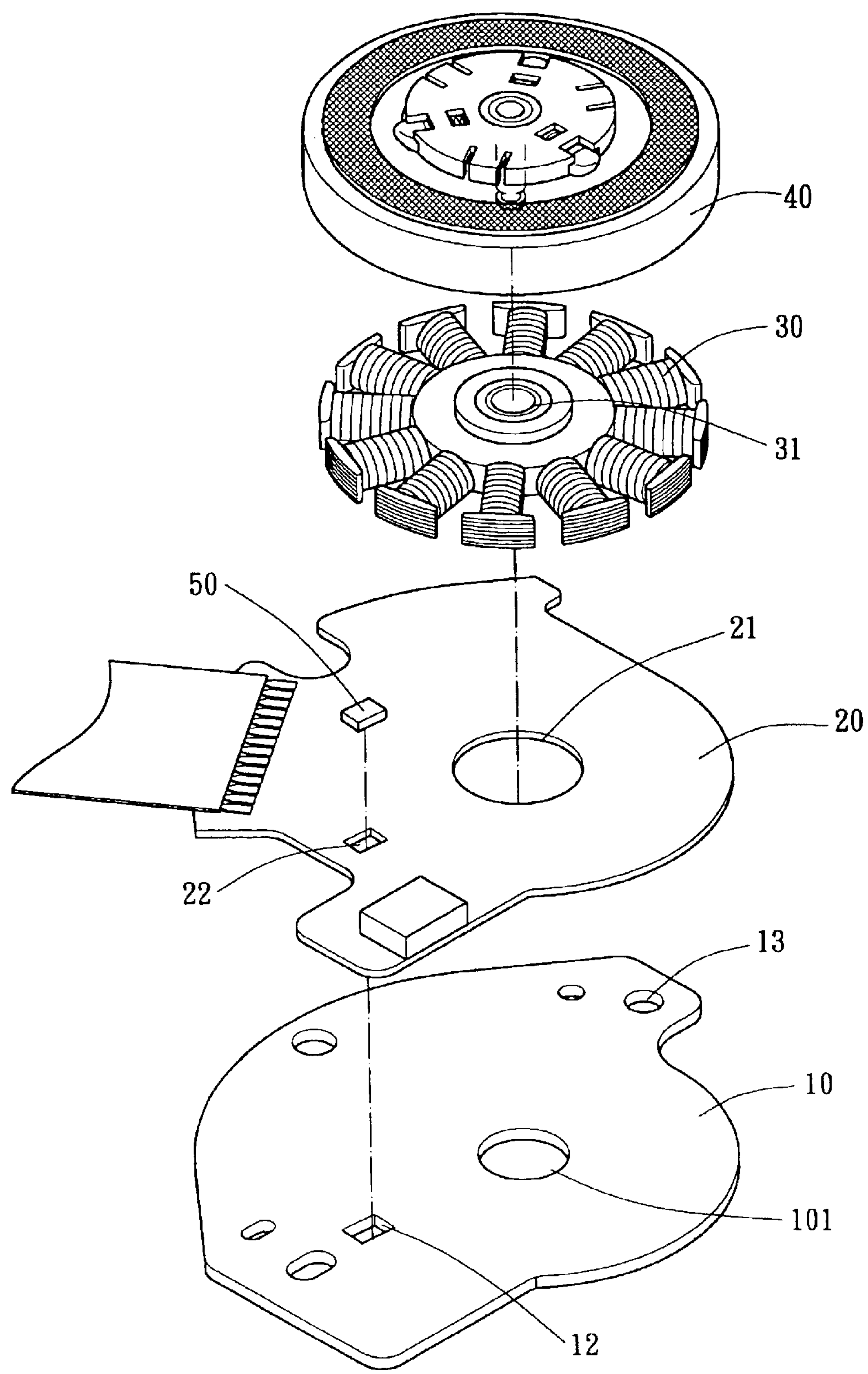
FIG. 3 is an exploded drawing of a motor structure according to a first embodiment of the present invention.
Figure 4:
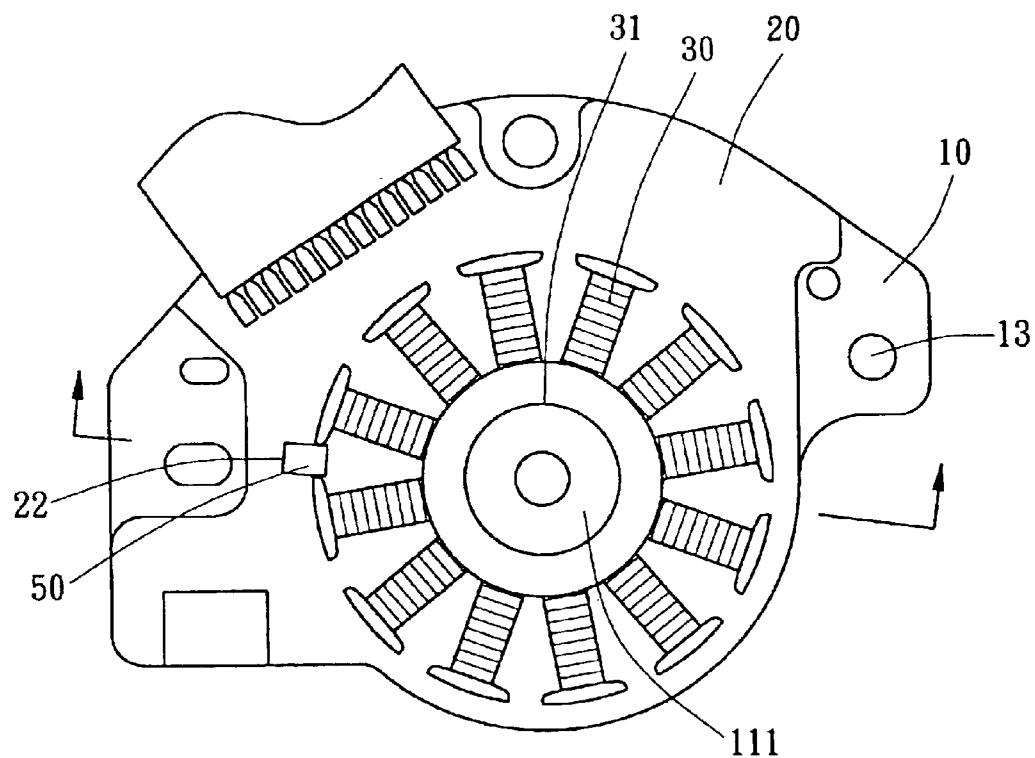
FIG. 4 is a top view drawing of the motor structure according to the first embodiment of the present invention.
Figure 5:
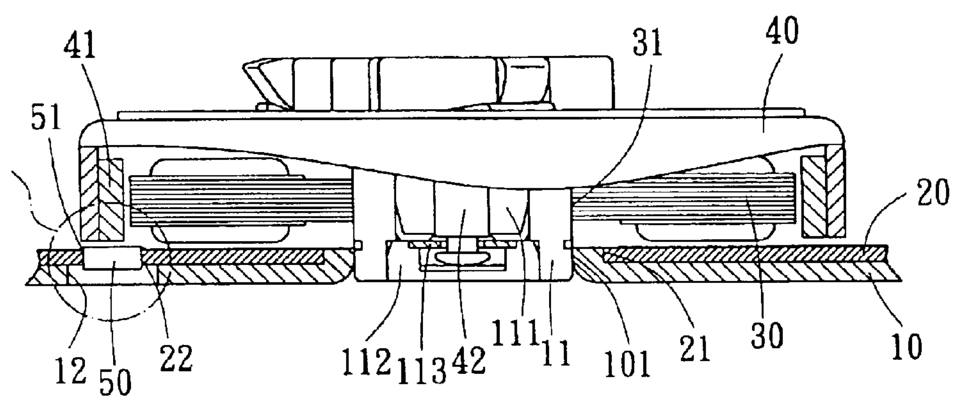
FIG. 5 is a cross sectional drawing, taken along line 5—5, in FIG. 4 according to the present invention.
Figure 6:
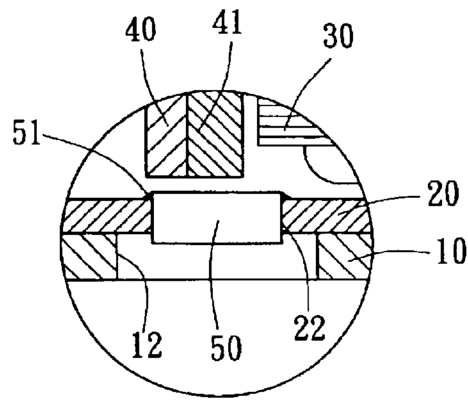
FIG. 6 is an enlarged view in FIG. 5 according to the present invention.
Figure 7:
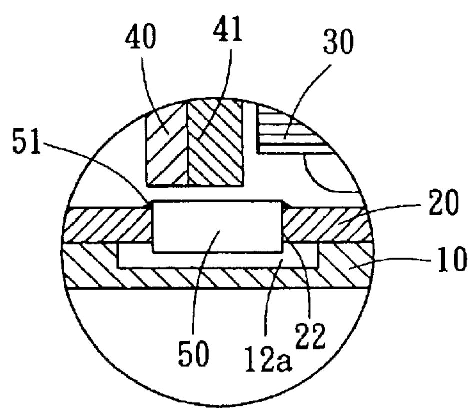
FIG. 7 is an enlarged view of a motor structure according to a second embodiment of the present invention.
Figure 8:
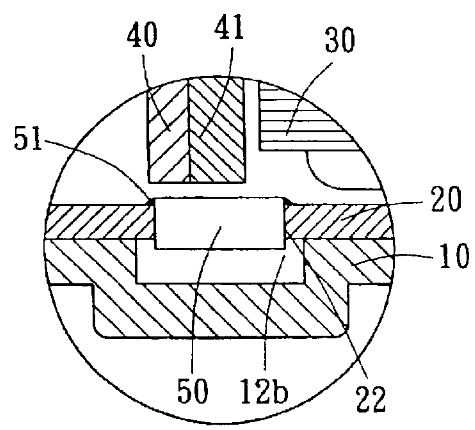
FIG. 8 is an enlarged view of a motor structure according to a third embodiment of the present invention.
Figure 9:
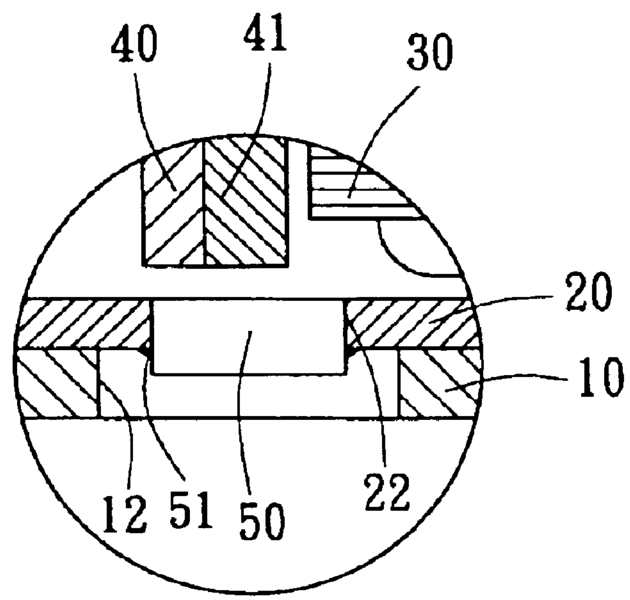
FIG. 9 is an enlarged view of a motor structure according to a fourth embodiment of the present invention.
Figure 10:
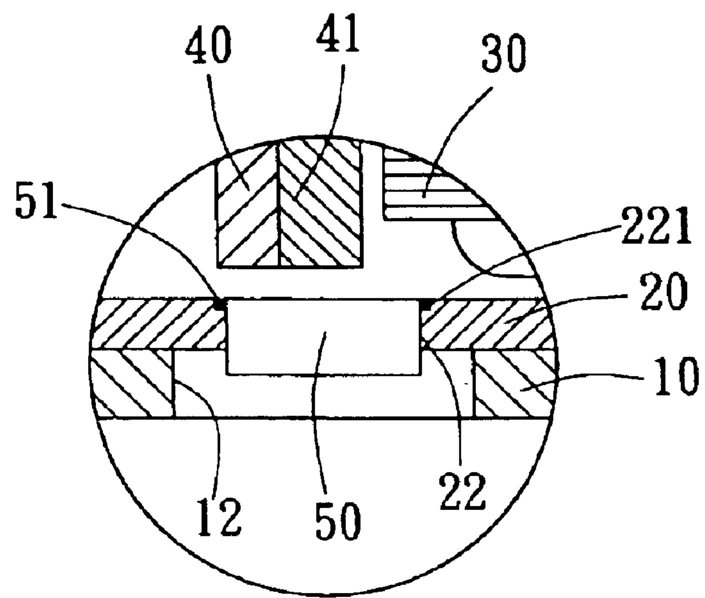
FIG. 10 is an enlarged view of a motor structure according to a fifth embodiment of the present invention.
Figure 11:
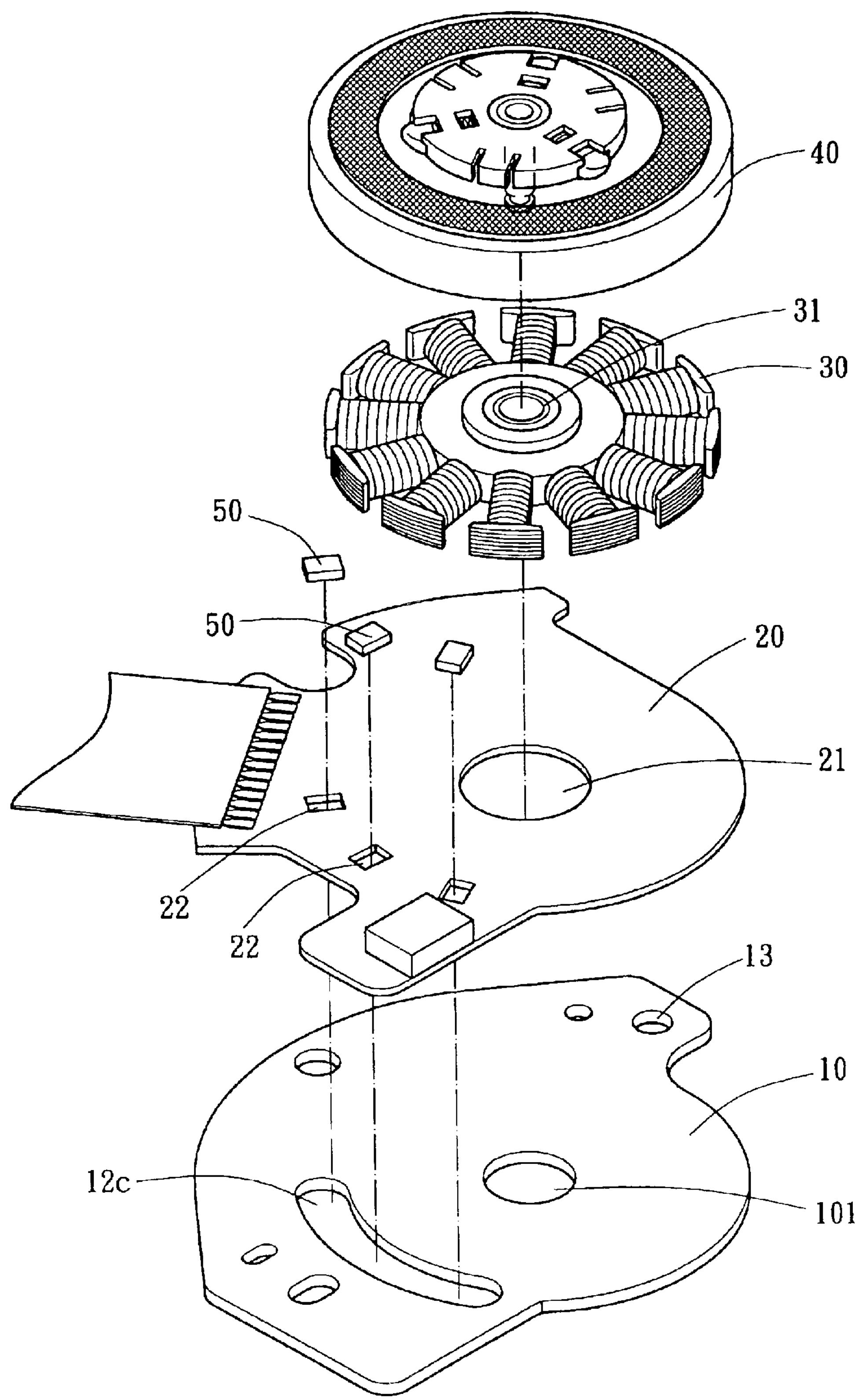
FIG. 11 is an exploded view of a motor structure according to a sixth embodiment of the present invention.

FIG. 3 is an exploded drawing of a motor structure according to a first embodiment of the present invention. FIG. 4 is a top view drawing of the motor structure according to the first embodiment of the present invention. FIG. 5 is a cross sectional drawing, taken along line 5—5, in FIG. 4 according to the present invention. FIG. 6 is an enlarged view in FIG. 5 according to the present invention. FIG. 7 is an enlarged view of a motor structure according to a second embodiment of the present invention. FIG. 8 is an enlarged view of a motor structure according to a third embodiment of the present invention. FIG. 9 is an enlarged view of a motor structure according to a fourth embodiment of the present invention. FIG. 10 is an enlarged view of a motor structure according to a fifth embodiment of the present invention. FIG. 11 is an exploded view of a motor structure according to a sixth embodiment of the present invention.

Figure 1:
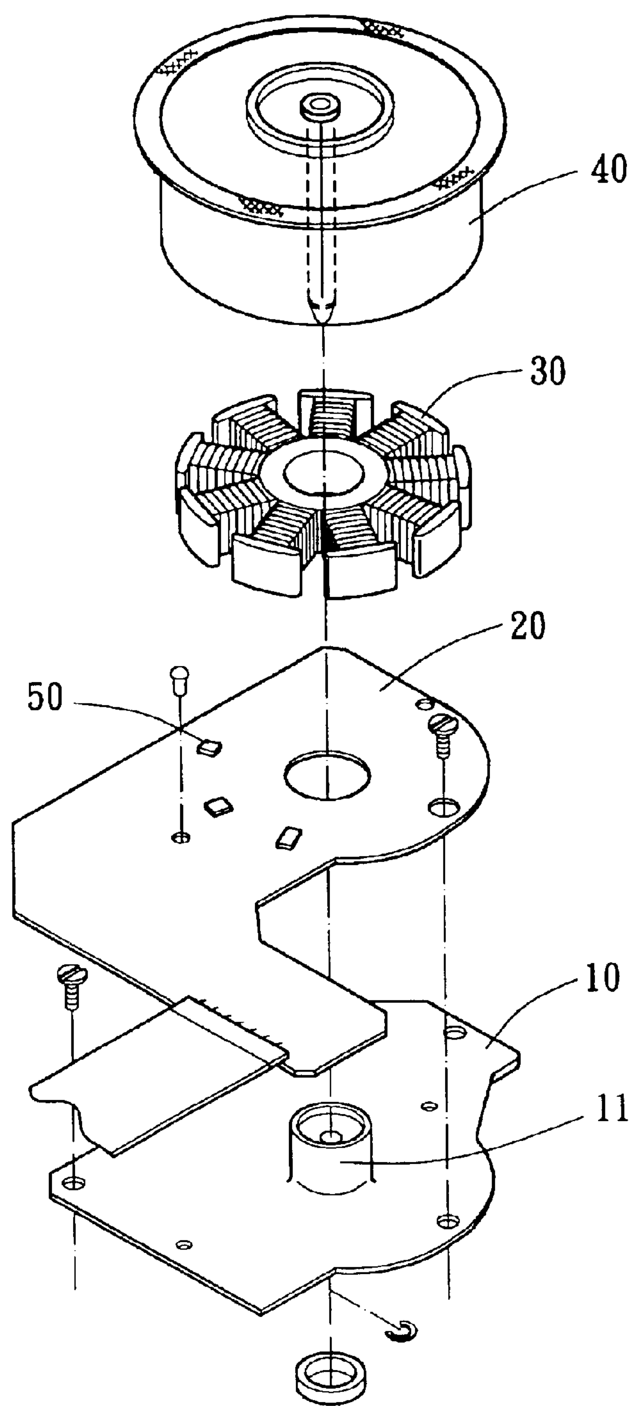
FIG. 1 is an exploded drawing of a prior art motor structure.
Figure 2:
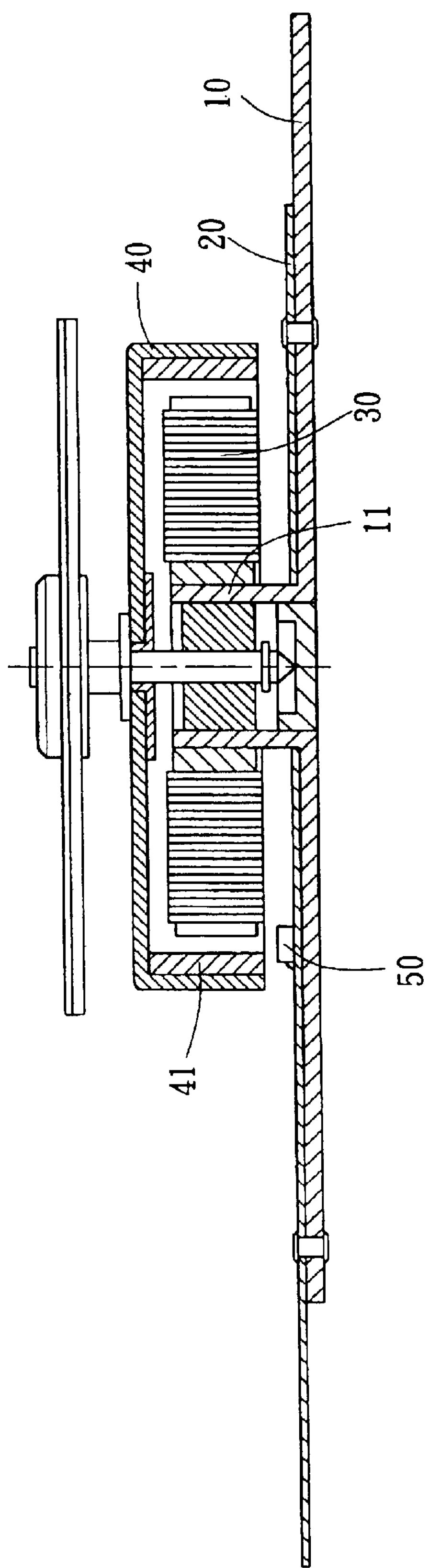
FIG. 2 is a cross-sectional drawing of the prior art motor structure.

Some elements of the motor of the present invention are similar to the prior art motor shown in FIG. 1 and FIG. 2, and these identical elements have the same item numbers, and no further detailed description is provided.

Referring to FIGS. 3 to 6, the motor of the first embodiment includes a base board 10, a printed circuit board 20, a stator 30 and a rotor 40. The base board 10 has an axle hole 101, an axle tube 11, at least one first assembly hole 12 and a plurality of fixing holes 13. The printed circuit board 20 has an axel hole 21 and at least one second assembly hole 22. The stator 30 has an axel hole 31. The rotor 40 has an annular magnet 41 and a shaft 42. The base board 10 is made of metal or high hardness material. The axial tube 11 is combined with the base board 10 or punched from the base board 10 to constitute a monolithic piece. An outer circumference of the axle tube 11 is tightly combined with the axle hole 31 of the stator 30. A bearing 111 , a support 112 and a C clip 113 are contained in the axel tube 11 for receiving and retaining the shaft 42 of the rotor 40. The printed circuit board 20 is attached to the upper surface of the base board 20 by adhesion, screws or latches. The first assembly hole 12 of the base board 10 and the second assembly hole 22 of the printed circuit board 20 are preferably through holes that align with each other at a position below the annular magnet 41 of the rotor 40. The first assembly hole 12 of the base board 10 is usually sized greater than or equal to of the second assembly hole 22 of the printed circuit board 20. Furthermore, the fixing holes 13 are used for positioning the motor at a desired position (as in a thin optical disk drive).

Referring again to FIGS. 5 and 6, during assembling the motor, at least one sensing unit 50 can be placed between the first assembly hole 12 of the base board 10 and the second assembly hole 22 of the printed circuit board 20 for sensing the annular magnet 41 of the rotor 40. The sensing unit 50 is usually welded on an upper surface of the printed circuit board 20 and thus formed at least one contact point 51 with the printed circuit board 20. After assembling, the sensing unit 50 should be almost completely embedded between the first assembly hole 12 and the second assembly hole 22, without occupying any extra space above the printed circuit board 20. Therefore, an increase of an axial height of the motor can be avoided, which enables the motor to be applied to small-sized electronic devices, such as thin optical disk drives. In addition, it is convenient for positioning the sensing unit 50 due to the first assembly hole 12 and the second assembly hole 22.

Furthermore, since the dimensions of the first assembly hole 12 of the base board 10 are usually larger than those of the second assembly hole 22 of the printed circuit board 20, even if there is a small tolerance in difference between the base board 10 and the printed circuit board 20, the first assembly hole 12 and the second assembly hole 22 can still contain the sensing unit 50 easily.

Referring to FIG. 7, it shows a motor structure according to a second embodiment of the present invention. Compared with the first embodiment, a first assembly hole 12*a* of the base board 10 of the second embodiment is a blind hole. Therefore, the sensing unit 50 should be almost completely embedded between the first assembly hole 12*a* and the second assembly hole 22 so that an increase of the axial height of the motor can be avoided.

Referring to FIG. 8, it shows a motor structure according to a third embodiment of the present invention. Compared with the first embodiment, a first assembly hole 12*b* of the base board 10 of the third embodiment is a sink formed by press molding. Therefore, the sensing unit 50 should be almost completely embedded between the first assembly hole 12*b* and the second assembly hole 22 so that an increase of the axial height of the motorcan be avoided. In addition, there is a larger space on the back of the base board 10 so that, even if the first assembly hole 12*b* protrudes slightly from the back of the base board 10, the axial height of the motor is not increased.

Referring to FIG. 9, it shows a motor structure according to a third embodiment of the present invention. Compared with the first embodiment, the printed circuit board 20 of the fourth embodiment is welded to the sensing unit 50 along a lower surface. Therefore, the contact point 51 of the sensing unit 50 is located at the lower surface of the printed circuit board 20 to avoid protruding it from the upper surface, and the sensing unit 50 should be almost completely embedded between the first assembly hole 12*a* and the second assembly hole 22 that decreases the axial height of the motor.

Referring to FIG. 10, it shows a motor structure according to a fifth embodiment of the present invention. In the fifth embodiment, an annular groove 221 is further formed along a periphery of the second assembly hole 22. The annular groove 221 can be used to contain the contact point 51 of the sensing unit 50 so that the sensing unit 50 can be electrically connected to a circuit layout on the upper surface of the printed circuit board 20 without protruding from the printed circuit board 20. Therefore, the sensing unit 50 should be almost completely embedded between the first assembly hole 12*a*and the second assembly hole 22 that decreases the axial height of the motor.

Referring to FIG. 11, it shows a motor structure according to a sixth embodiment of the present invention. In the sixth embodiment, a first assembly hole 12*c* of the base board 10 is an enlarged slot. Therefore, if the present invention uses more than one sensing unit 50, the enlarged slot of the first assembly hole 12*c* of the base board 10 can be aligned with several second assembly holes of the printed circuit board 20 that simplifies the assembly procedure. Furthermore, the same specification of base board 10 can be used in combination with different printed circuit boards 20 with different numbers of the second assembly holes 22 to reduce manufacturing costs.

According to the above-mention description, compared with the prior art motor shown in FIG. 1 that is directly welded on the upper surface of the printed circuit board 20, which increases the axial height of the motor, the motor of the present invention provides the first assembly hole 12 and the second assembly hole 22 on the base board 10 and the printed circuit board 20 to contain the sensing unit 50, and so the axial height of the motor is decreased and a positioning process of the sensing unit 50 is made easier.

Although the present invention has been explained in relation to its preferred embodiments, it is to be understood that many other possible modifications and variations can be made without departing from the spirit and scope of the invention as hereinafter claimed

What is claimed is:

1. A combination structure of a motor comprising:

a base board adapted to mount a stator and a rotor, and having at least one first assembly hole;

a printed circuit board attached to the base board and having second assembly holes, the second assembly holes being aligned with the first assembly hole of the base board, wherein said first assembly hole of the base board is an enlarged slot and is used to align with a plurality of said second assembly holes of the printed circuit board; and at least one sensing unit adapted to sense a magnet of the rotor, the sensing unit mounted in the first assembly hole of the base board and the second assembly hole of the printed circuit board.

2. The combination structure of a motor as claimed in claim 1, wherein the first assembly hole of the base board is a through hole.

3. The combination structure of a motor as claimed in claim 1, wherein the first assembly hole of the base board is a blind hole.

4. The combination structure of a motor as claimed in claim 1, wherein the first assembly hole of the base board is a sink.

5. The combination structure of a motor as claimed in claim 1, wherein dimensions of the first assembly hole of the base board are larger than those of the second assembly holes of the printed circuit board.

6. The combination structure of a motor as claimed in claim 1, wherein the sensing unit is welded on a lower surface of the printed circuit board.

7. The combination structure of a motor as claimed in claim 1, wherein the sensing unit is welded on a lower surface of the printed circuit board.

8. The combination structure of a motor as claimed in claim 1, wherein a circumferences of the second assembly holes further include an annular groove for containing at least one contact of the sensing unit.

9. The combination structure of a motor as claimed in claim 1, wherein the printed circuit board is coupled to an upper surface of the base board by adhesion, screws or a hooking manner.

10. The combination structure of a motor as claimed in claim 1, wherein the base board further has an axle tube for combining with the stator and the rotor.

11. The combination structure of a motor as claimed in claim 1, wherein the base board and the axle tube are formed as a monolithic piece.

* * * * *